US012539101B2

(12) United States Patent
McLaughlin et al.

(10) Patent No.: US 12,539,101 B2
(45) Date of Patent: Feb. 3, 2026

(54) ULTRASOUND PROBE ACCESSORY IMPLEMENT

(71) Applicant: Bard Access Systems, Inc., Salt Lake City, UT (US)

(72) Inventors: William Robert McLaughlin, Bountiful, UT (US); Steffan Sowards, Salt Lake City, UT (US); Anthony K. Misener, Bountiful, UT (US); Bart Peterson, Farmington, UT (US); Bradley M. Wilkinson, North Haledon, NJ (US); Mark Newby, Kamas, UT (US)

(73) Assignee: Bard Access Systems, Inc., Salt Lake City, UT (US)

( * ) Notice: Subject to any disclaimer, the term of this patent is extended or adjusted under 35 U.S.C. 154(b) by 0 days.

(21) Appl. No.: 17/899,386

(22) Filed: Aug. 30, 2022

(65) Prior Publication Data

US 2024/0065674 A1    Feb. 29, 2024

(51) Int. Cl.
*A61B 8/00* (2006.01)

(52) U.S. Cl.
CPC .......... *A61B 8/4411* (2013.01); *A61B 8/4281* (2013.01); *A61B 8/4422* (2013.01); *A61B 8/4455* (2013.01)

(58) Field of Classification Search
CPC ..... A61B 17/3403; A61B 8/42; A61B 8/4433; A61B 8/4422; A61B 8/4281; A61B 8/4411; A61B 8/4209
See application file for complete search history.

(56) References Cited

U.S. PATENT DOCUMENTS 5,076,279 A * 12/1991 Arenson ................ A61B 46/10
                                                      600/459
5,997,481 A * 12/1999 Adams ................. A61B 8/4281
                                                      600/459

(Continued)

FOREIGN PATENT DOCUMENTS

| CN | 107616813 A | | 1/2018 |
| KR | 20210059506 A | * | 5/2021 |

OTHER PUBLICATIONS

PCT/US2023/031368 filed Aug. 29, 2023 International Search Report and Written Opinion dated Nov. 6, 2023.

*Primary Examiner* — Anh Tuan T Nguyen
*Assistant Examiner* — Younhee Choi
(74) *Attorney, Agent, or Firm* — Rutan & Tucker LLP (57) ABSTRACT

Ultrasound probe assemblies including the probe, a sheath, and an accessory implement that may be selectively attached to and detached form the probe. The implement includes an attachment surface for attaching accessories thereto. The attachment surface includes a defined angle with respect to the head of the probe so that accessories attached thereto are disposed in a defined alignment with the probe. The implement includes a circumferential wall defining a cavity configure to receive the probe head therein. The cavity includes a bottom opening to expose a patient coupling surface of the probe. The assembly may include an ultrasound gel disposed within the opening. The sheath may include a stretchable band to secure the sheath to the probe. The sheath defines a sterile barrier and may be attached to the implement.

20 Claims, 4 Drawing Sheets

(56) References Cited

U.S. PATENT DOCUMENTS

| | | | |
|---|---|---|---|
| 2002/0068871 A1* | 6/2002 | Mendlein | A61B 8/4209 600/459 |
| 2003/0195420 A1 | 10/2003 | Mendlein et al. | |
| 2004/0133111 A1* | 7/2004 | Szczech | A61B 17/3403 600/461 |
| 2005/0267373 A1* | 12/2005 | Lee | A61B 17/3403 600/437 |
| 2006/0020211 A1* | 1/2006 | Tokumoto | A61B 8/0833 600/464 |
| 2006/0129046 A1* | 6/2006 | Stevens | A61B 8/0833 604/116 |
| 2007/0112272 A1* | 5/2007 | Park | A61B 17/3403 600/461 |
| 2009/0143684 A1* | 6/2009 | Cermak | A61B 17/3403 600/461 |
| 2010/0160787 A1* | 6/2010 | Gorzitze | A61M 5/427 600/461 |
| 2010/0234733 A1* | 9/2010 | Wahlheim | A61B 8/4281 600/459 |
| 2012/0089013 A1* | 4/2012 | Whitmore, III | A61B 5/064 600/424 |
| 2014/0275990 A1* | 9/2014 | Hagy | A61B 8/0841 600/424 |
| 2016/0192903 A1* | 7/2016 | Nordgren | A61B 8/4422 600/437 |
| 2019/0374198 A1* | 12/2019 | Mullen | A61B 8/4422 |
| 2020/0281563 A1* | 9/2020 | Muller | A61B 8/5207 |
| 2020/0383660 A1* | 12/2020 | Rothberg | A61B 8/4281 |
| 2021/0059639 A1 | 3/2021 | Howell | |
| 2021/0140580 A1* | 5/2021 | Nahum | A45C 11/00 |

* cited by examiner

ULTRASOUND PROBE ACCESSORY IMPLEMENT

BACKGROUND

Obtaining ultrasound images may be employed during a various medical procedures. Ultrasound systems and the associated ultrasound probes may be combined with a accessories to enhance the performance of the medical procedures or reduce patient risk. However, the modification of the ultrasound probe to accommodate attachment of multiple different accessories including new accessories may be cost prohibitive and logically complex. Assemblies and devices disclosed herein address the forgoing.

SUMMARY

Disclosed herein is an ultrasound probe assembly that includes (i) an ultrasound probe defining a probe head at a bottom end of the ultrasound probe, the probe head having a patient coupling surface, (ii) a sheath covering the ultrasound probe, and (iii) an accessory implement secured to the ultrasound probe, where the accessory implement is configured to enable attachment of a probe accessory to the ultrasound probe.

In some embodiments, the accessory implement is configured for selective attachment to and detachment from the ultrasound probe via a securement mechanism.

In some embodiments, the accessory implement includes a circumferential wall defining a cavity having, where the cavity includes a top opening through which the probe head is inserted and a bottom opening extending across the patient coupling surface.

In some embodiments, the accessory implement includes an accessory attachment surface configured for attachment of the probe accessory thereto, the accessory attachment surface disposed at a defined position and orientation with respect to the probe head. In some embodiments, the accessory attachment surface includes an accessory connector.

In some embodiments, the accessory implement includes a protrusion located so as to extend away from a back side of the ultrasound probe, the protrusion configured to enable a clinician to grasp the ultrasound probe via two fingers. In some embodiments, the protrusion is transitionable between an extended state and collapsed state.

In some embodiments, the securement mechanism includes one or more deflectable clips configured to extend at least partially around the ultrasound probe.

In some embodiments, the accessory implement includes a front wall extending across a front side of the ultrasound probe, the front wall including an opening extending across a control panel of the ultrasound probe.

In some embodiments, the sheath is disposed between the ultrasound probe and the accessory implement.

In some embodiments, the sheath includes a stretchable portion defining a reduced circumference of the sheath, the stretchable portion configured to secure the sheath to the ultrasound probe.

In some embodiments, wherein the sheath includes an ultrasound coupling area extending across the patient coupling surface of the ultrasound probe, the ultrasound coupling area including an ultrasound coupling capability that exceeds other portions of the sheath extending away from the ultrasound coupling area. In some embodiments, the ultrasound coupling area includes the ultrasound gel.

In some embodiments, the sheath and the accessory implement are inseparably attached to each other.

Also disclosed is an accessory attachment implement for an ultrasound probe that includes (i) a circumferential wall defining a cavity having a top opening and bottom opening, the cavity configured to receive a head of the ultrasound probe therein via the top opening and (ii) a back wall coupled with and extending upwardly away from the circumferential wall, the back wall including an attachment mechanism configured to secure the implement to the ultrasound probe. The bottom opening is sized and shaped to correspond to a patient coupling surface of the ultrasound probe, and the circumferential wall defines an accessory attachment surface disposed at a defined angle with respect to the patient coupling surface, where the accessory attachment surface includes an accessory connector.

In some embodiments, the implement further includes an ultrasound gel disposed within the bottom opening.

In some embodiments, the implement further includes a sheath coupled with the circumferential wall, the sheath configured to cover the ultrasound probe.

In some embodiments, the ultrasound gel is coupled with the sheath.

In some embodiments, the sheath includes a stretchable band configured to cinch the sheath around the ultrasound probe.

These and other features of the concepts provided herein will become more apparent to those of skill in the art in view of the accompanying drawings and following description, which describe particular embodiments of such concepts in greater detail.

DESCRIPTION

Before some particular embodiments are disclosed in greater detail, it should be understood that the particular embodiments disclosed herein do not limit the scope of the concepts provided herein. It should also be understood that a particular embodiment disclosed herein can have features that can be readily separated from the particular embodiment and optionally combined with or substituted for features of any of a number of other embodiments disclosed herein.

Regarding terms used herein, it should also be understood the terms are for the purpose of describing some particular embodiments, and the terms do not limit the scope of the concepts provided herein. Ordinal numbers (e.g., first, second, third, etc.) are generally used to distinguish or identify different features or steps in a group of features or steps, and do not supply a serial or numerical limitation. For example, "first," "second," and "third" features or steps need not necessarily appear in that order, and the particular embodiments including such features or steps need not necessarily be limited to the three features or steps. Labels such as "left," "right," "top," "bottom," "front," "back," and the like are used for convenience and are not intended to imply, for example, any particular fixed location, orientation, or direction. Instead, such labels are used to reflect, for example, relative location, orientation, or directions. Singular forms of "a," "an," and "the" include plural references unless the context clearly dictates otherwise.

The phrases "connected to," "coupled to," and "in communication with" refer to any form of interaction between two or more entities, including but not limited to mechanical, electrical, magnetic, electromagnetic, fluid, and thermal interaction. Two components may be coupled to each other even though they are not in direct contact with each other. For example, two components may be coupled to each other through an intermediate component.

Unless defined otherwise, all technical and scientific terms used herein have the same meaning as commonly understood by those of ordinary skill in the art.

Figure 1A:
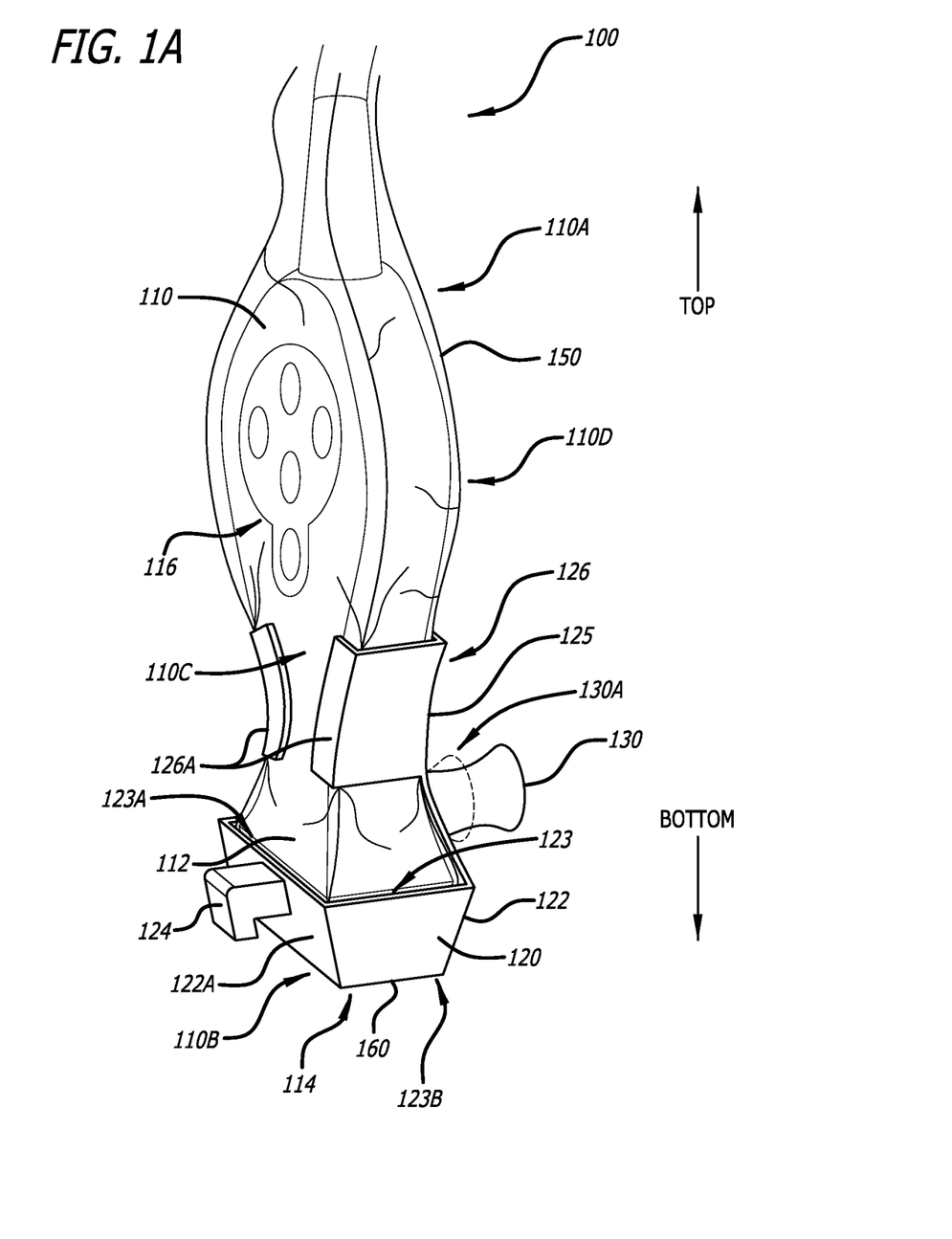
FIG. 1A illustrates an ultrasound probe assembly including an accessory implement, in accordance with some embodiments.

FIG. 1A illustrates an ultrasound probe assembly, in accordance with some embodiments. The ultrasound probe assembly (assembly) 100 generally includes an ultrasound probe (probe) 110 coupled with an accessory attachment implement (implement) 120 and a sheath 150. The implement 120 is selectively attached to the probe 110 so that a clinician may attach the implement 120 to the probe and/or detach the implement 120 from the probe 110. The implement 120 is generally configured to provide for attachment of accessories to the probe 110, such as a needle guide, for example. The assembly 100 may be provided to a clinician in an assembled state or the clinician may couple the implement 120 and/or the sheath 150 to the probe 110 at the point of use. In the illustrated embodiment, the implement 120 and the sheath 150 may be configured for single use. In some embodiments, the sheath 150 covers the probe 110 and defines a sterile barrier for the probe 110.

The probe 110 generally defines a longitudinal shape extending between a top end 110A and a bottom end 110B. The probe 110 includes a probe head 112 having a patient coupling surface 114 extending across the bottom end 112. The patient coupling surface 114 is configured to define an acoustically intimate coupling with the skin surface of the patient during use. The probe 110 may include a control panel 116 having a number of input devices, such as buttons, a scroll wheel, a joystick, or the like to enable to the clinician to operate the probe 110. The probe 110 defines a front side 110C and an opposite back side 110D. In the illustrated embodiment, the control panel 116 is located on the front side 110C. In some embodiments, the assembly 100 may include an ultrasound gel 160 disposed across the patient coupling surface 114 to help establish the acoustically intimate coupling.

The implement 120 is coupled with the probe head 112 in the illustrated embodiment. In other embodiments, the implement 120 may be coupled with another portion of the probe 110, such as a front, back, or side surface, for example. In the illustrated embodiment, the implement 120 includes a circumferential wall 122 extending around the probe head 112, i.e., the circumferential wall 122 defines a cavity 123 and the probe head 112 is inserted into the cavity 123 via a top opening 123A of the cavity 123. The cavity 123 includes bottom opening 123B extending across the patient coupling surface 114 so as to not cover any portion of the patient coupling surface 114. In some embodiments, the bottom opening 123B may define a size and shape the correspond to (i.e., are similar to) the size and shape of the patient coupling surface 114. The cavity 123 may also define a size and shape that correspond to the size and shape of the of the probe head 112 so that when the implement 120 is coupled with the probe head 112, motion of the probe head 112 relative to the implement 120 is prevented, inhibited, or otherwise minimized.

The circumferential wall 122 defines an attachment surface 122A that is generally configured to enable secure attachment of an accessory (e.g., the needle guide) to the probe 110 via the implement 120. The attachment surface 122A may be disposed at a defined angle with respect to the patient coupling surface 114 so that the accessory, when attached to the attachment surface 122A, is positioned and oriented in a defined alignment with the patient coupling surface 114, the probe head 112, or the probe 110. In some embodiments, the attachment surface 122A may include an accessory connector 124, where the accessory connector 124 is configured to attach to the accessory to the implement 120. In some embodiments, the connector 124 may include a hook or a slide, i.e., the accessory connector 124 may include a hook component or a slide component. In the illustrated embodiment, the attachment surface 122A is disposed adjacent the front side 110C of the probe 110. In other embodiments, the attachment surface 122A may be disposed adjacent another side of the probe 110, such as the back side 110D, for example. In some embodiments, the circumferential wall 122 may define more than one attachment surface.

The implement 120 may also include a back wall 125 coupled with the circumferential wall 122, where the back wall extends upward away from the circumferential wall 122 along the back side 110D of the probe 110. The back wall 125 includes a securement mechanism 126 configured to secure the implement 120 to the probe 110. As discussed above, the securement mechanism 126 may be configured to attachment of the implement 120 to the probe 110 and detachment of the implement 120 from the probe 110 by the clinician. In some embodiments, the securement mechanism 126 includes one or more deflectable clip members 126 to define the securement of the implement 120 to the probe 110 by extending at least partially around the probe 110. The implement 120 may be formed any suitable rigid material, such as a thermoplastic material, for example.

In some embodiments, the implement 120 may be configured to enhance a handling capability of the probe 110. In the illustrated embodiment, the implement 120 includes a protrusion 130 extending away from the back wall 125. In some embodiments, the protrusion 130 may in some respects resemble a "pop socket" attachment for a cell phone. As such, the protrusion 130 may enable the clinician to grasp, manipulate, or otherwise handle the probe 110 using two fingers (e.g., the middle and ring fingers) of one hand. By grasping the probe 110 via two fingers, the clinician may use the thump of the same hand to manipulate the input devices of the control panel 116. In some embodiments, the protrusion 130 may be configured to transition between an extended state as illustrated and a collapsed state 130A indicated via phantom lines.

The sheath 150 is generally configured to provide a sterile barrier for the probe 110 since in some instances of use, the probe 110 may be non-sterile. As such, the sheath 150 may cover all or a portion of the probe 110. In some embodiments, the sheath 150 may define a tubular shape having a closed bottom end and an open top end. In other embodiments, the sheath 150 may include a defined pre-form that corresponds with a shape of the probe 110, such as a shape of the probe head 112, for example. In some embodiments, the sheath 150 may be formed of any polymeric sheet material that is flexible but generally non-stretchable, such as high density polyethylene (HDPE), low density polyethylene (LDPE), linear low density polyethylene (LLDPE), medium density polyethylene (MDPE), or polypropylene (PP) for example. In such embodiments, the shape and size of the sheath 150 may be configured to receive the probe 110 therein in a non-stressed state.

In other embodiments, the sheath 150 may be formed of elastomeric material, such as a silicone rubber, for example, that is flexible and stretchable. In such other embodiments, the shape and size of the sheath 150 may be configured so that at least a portion of the sheath is stretched or expanded to receive the probe 110 therein. As such, insertion of the probe 110 into the sheath 150 may include expanding the sheath 150 (or portion thereof) to fit the probe 110 within the sheath 150, thereafter allowing the sheath 150 to contract so as to conform to a shape of the probe 110.

Figure 1B:
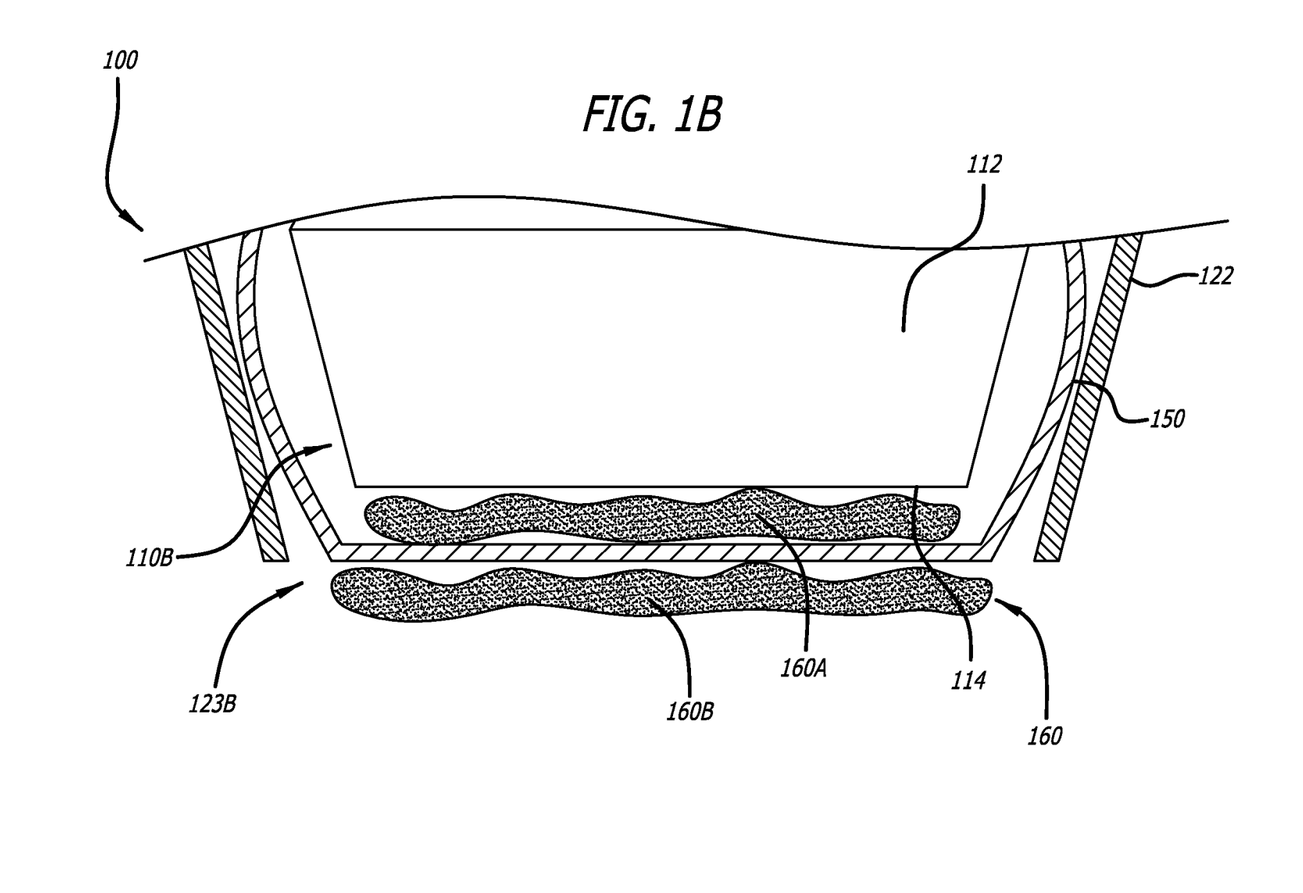
FIG. 1B illustrates a detailed cross-sectional illustration of bottom portion of the ultrasound probe assembly of FIG. 1A, in accordance with some embodiments.

FIG. 1B illustrates a detailed cross sectional view of a bottom end portion of the system 100. Shown are the probe head 112 and the associated patient coupling surface 114, where the patient coupling surface 114 is disposed adjacent the bottom opening 123B of the cavity 123. The sheath 150 is shown disposed across the patient coupling surface 114 so as to minimize a gap between the sheath 150 and patient coupling surface 114.

The ultrasound gel 160 is shown disposed within the opening 123B. In some embodiments, a first portion 160A of the ultrasound gel 160 may be disposed between the sheath 150 and the patient coupling surface 114 and a second portion 160B of the ultrasound gel 160 may be disposed on an exterior surface of the sheath 150. In various embodiments, either the first portion 160A or the second portion 160B may be omitted.

Figures 2, 3, 4:
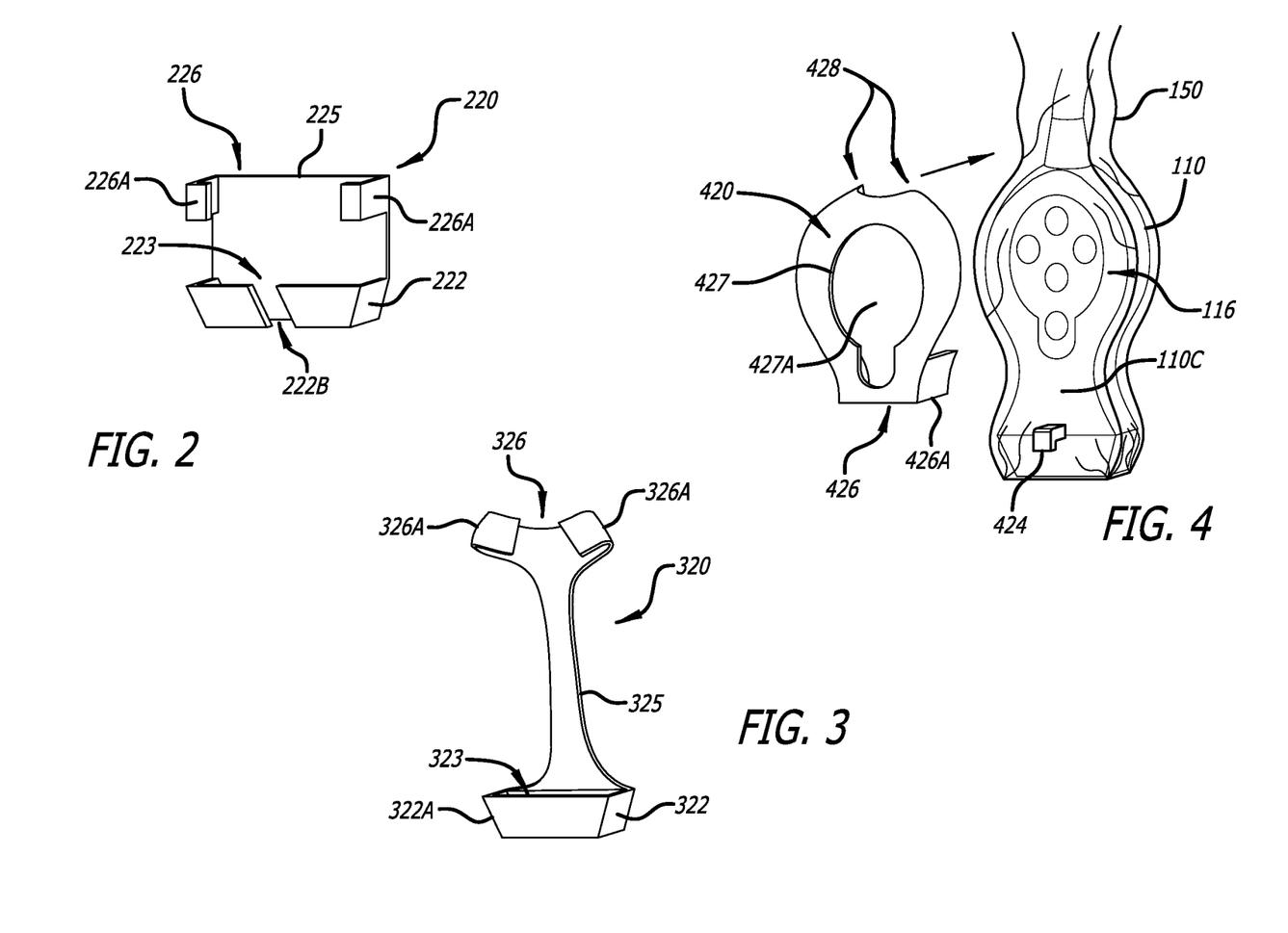
FIG. 2 illustrates a second embodiment of the accessory implement of FIG. 1A, in accordance with some embodiments.
FIG. 3 illustrates a third embodiment of the accessory implement of FIG. 1A, in accordance with some embodiments.
FIG. 4 illustrates a forth embodiment of the accessory implement of FIG. 1A, in accordance with some embodiments.

FIG. 2 illustrates another embodiment of an accessory attachment implement (implement) that can, in certain respects, resemble the components and functionality of the accessory attachment implement 120 described in connection with FIGS. 1A-1B. It will be appreciated that all the illustrated embodiments may have analogous features. Accordingly, like features are designated with like reference numerals with a leading digit incremented to of "2." Relevant disclosure set forth above regarding similarly identified features thus may not be repeated hereafter. Moreover, specific features of the accessory attachment implement and related components shown in FIGS. 1A-1B may not be shown or identified by a reference numeral in the drawing or specifically discussed in the written description that follows. However, such features may clearly be the same, or substantially the same, as features depicted in other embodiments and/or described with respect to such embodiments. Accordingly, the relevant descriptions of such features apply equally to the features of the accessory attachment implement of FIG. 2. Any suitable combination of the features, and variations of the same, described with respect to the accessory attachment implement and components illustrated in FIGS. 1A-1B can be employed with the accessory attachment implement and components of FIG. 2, and vice versa. This pattern of disclosure applies equally to further embodiments depicted in subsequent figures and described hereafter.

The implement 220 is generally configured to attach to the probe head 112 of the probe 110. Similar to the implement 120, the implement 220 includes a circumferential wall 222, a back wall 225, and a securement mechanism 226 including clip members 226A. The circumferential wall 222 defines a cavity 223. In the illustrated embodiment, the circumferential wall 222 includes a gap 222B extending through the circumferential wall 222. In some embodiments, the probe 110 may include an accessory connector attached to the probe 120 (see FIG. 4). As such, the gap 222B may be configured to accommodate the accessory connector attached to the probe 110.

FIG. 3 illustrates another embodiment of an accessory attachment implement. The implement 320 is generally configured to attach to the probe 110 at the probe head 112 and also near the top end 110A (see FIG. 1A) of the probe 110. Similar to the implement 120, the implement 320 includes a circumferential wall 322, a back wall 325, a securement mechanism 326 including clip members 326A. The circumferential wall 322 defines a cavity 323. In the illustrated embodiment, the back wall 325 extends substantially toward the top end 110A of the probe 110 so that the securement mechanism 326 is disposed adjacent the top end 110A.

FIG. 4 illustrates another embodiment of an accessory attachment implement. The implement 420 is generally configured to attach to the probe 110 along the front side 110C of the probe 110. The implement 420 includes a front wall 427 having a front opening 427A extending therethrough. The front opening 427A is generally configured to provide access to the control panel 116 by the clinician. As such, the size and/or shape of the front opening 427A may correspond to (be similar to) the size and/or shape of the control panel 116. The implement 420 includes a securement mechanism 426 including clip members 426A disposed at a bottom end of the implement 420. The front wall 427 may include extended portions 428 disposed at a top end of the implement 420. The extended portions 428 are configured to extend at least partially around the probe 110 to further secure the implement 420 to the probe 110. In the illustrated embodiment, the probe 110 includes an accessory connector 424 and as such, the implement 420 may not include an attachment surface or the accessory connector. However, in some embodiments, the front wall 427 may include an attachment surface that may, in some respects, resemble the components, features, and functionality of the attachment surface 122A including the accessory connector 124.

Figure 5:
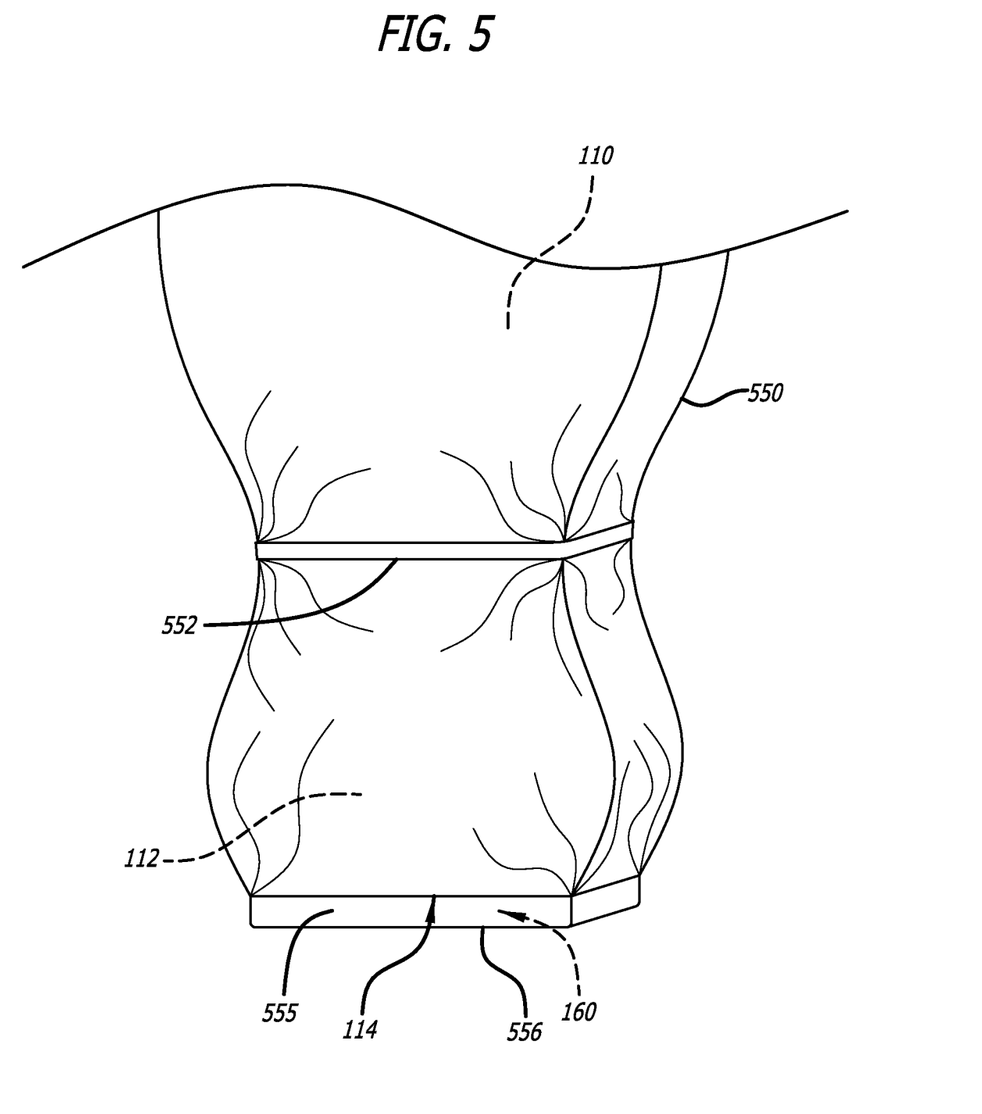
FIG. 5 illustrates another embodiment of the sheath of the ultrasound probe assembly of FIG. 1A, in accordance with some embodiments.

FIG. 5 illustrates another embodiment of a sheath 550 that can, in certain respects, resemble the features and functionality of the sheath 150 described in connection with FIGS. 1A-1B. It will be appreciated that all the illustrated embodiments may have analogous features. Accordingly, like features are designated with like reference numerals with a leading digit of "5." Relevant disclosure set forth above regarding similarly identified features thus may not be repeated hereafter. Moreover, specific features of the sheath shown in FIGS. 1A-1B may not be shown or identified by a reference numeral in the drawing or specifically discussed in the written description that follows. However, such features may clearly be the same, or substantially the same, as features depicted in other embodiments and/or described with respect to such embodiments. Accordingly, the relevant descriptions of such features apply equally to the features of the sheath of FIG. 5. Any suitable combination of the features, and variations of the same, described with respect to the sheath illustrated in FIGS. 1A-1B can be employed with the sheath of FIG. 5, and vice versa.

The sheath 550 includes a stretchable band 552 extending circumferentially around the sheath 550. The stretchable band 552 is generally configured to secure the sheath 550 to the probe 120. More specifically, the stretchable band 552 is configured to cinch the sheath 550 around a neck portion (area of reduced cross section) of the probe 110. The stretchable band 552 may be integrated into the sheath 550 or may be a separate piece. The stretchable band 552 may be formed a band material that is different than the sheath material. In the illustrated embodiment, the stretchable band 552 is coupled with an exterior of the sheath 550. In other embodiments, the stretchable band 552 may be coupled with an interior of the sheath 550. In some embodiments, the band material and the sheath material may be the same. In some embodiments, the stretchable band 552 may be portion of the sheath 550 having a reduced circumference with respect to other portions of the sheath 550.

The sheath 550 may include a patient coupling area 555 that when applied to the probe 110 is disposed adjacent the patient coupling surface 114 of the probe 110. The patient coupling area 555 may define a shape and/or size that corresponds to the shape and/or size of the patient coupling surface 114. The patient coupling area 555 is generally configured to enhance acoustic coupling of the patient coupling surface 114 with skin surface of the patient. Said another, the patient coupling area 555 may be configured to minimize any loss of acoustic coupling due to the presence of the sheath 550 between the patient coupling surface 114 and skin surface. For example, patient coupling area 555 (i) may include a thinner cross section, (ii) may be free of folds, or include a preform that matches the patient contact surface 114. In some embodiments, the stretchable band 552 may induce an enhanced acoustic coupling between the patient coupling area 555 and the patient coupling surface 114 by defining tension across the patient coupling area 555 thereby minimizing the propensity for voids or air gaps between the patient coupling area 555 and the patient coupling surface 114.

According to one embodiment, the patient coupling area 555 may include a pouch 556 for containing the ultrasound gel 160 therein, where the ultrasound gel 160 facilitates enhanced acoustic coupling. In some embodiments, the pouch 556 may be frangible so that the ultrasound gel 160 is released from the pouch 556 when the probe 110 is pressed against the skin surface. Such an embodiment, the ultrasound gel 160 released from the pouch 556 may be dispensed between that patient coupling surface 114 and the skin surface in lieu of the clinician dispensing ultrasound gel from a separate container.

While some particular embodiments have been disclosed herein, and while the particular embodiments have been disclosed in some detail, it is not the intention for the particular embodiments to limit the scope of the concepts provided herein. Additional adaptations and/or modifications can appear to those of ordinary skill in the art, and, in broader aspects, these adaptations and/or modifications are encompassed as well. Accordingly, departures may be made from the particular embodiments disclosed herein without departing from the scope of the concepts provided herein.

What is claimed is:

1. An ultrasound probe assembly, comprising:
    an ultrasound probe defining a probe head at a bottom end of the ultrasound probe, the probe head having a patient coupling surface;
    a sheath covering the ultrasound probe; and
    an accessory implement secured to the ultrasound probe, the accessory implement configured to enable attachment of a probe accessory to the ultrasound probe, the accessory implement including a circumferential wall extending contiguously around a cavity having a top opening and a bottom opening, the cavity configured to receive a head of the ultrasound probe therein via the top opening, wherein the bottom opening is sized and shaped to correspond to the patient coupling surface of the ultrasound probe, the circumferential wall defining:
        a front wall disposed along a front side of the cavity, wherein:
            the front wall includes an accessory attachment surface disposed at a defined angle with respect to the patient coupling surface, and
            the accessory attachment surface includes an accessory connector; and
        a back wall disposed along a back side of the cavity opposite the front side, wherein:
            the back wall extends contiguously upward to define an upper portion of the back wall,
            the upper portion is configured to extend along and adjacent to a back side of the ultrasound probe from a bottom end of the upper portion to a top end of the upper portion, and
            the upper portion adjacent the top end includes a securement mechanism configured to rigidly secure the accessory implement to the ultrasound probe,
        wherein the sheath is coupled with the circumferential wall along an inside surface of the circumferential wall, and
    wherein the accessory implement further includes a protrusion extending away from the back wall, the protrusion configured to enable a clinician to handle the ultrasound probe using only two fingers.

2. The assembly of claim 1, wherein the accessory implement is configured for selective attachment to and detachment from the ultrasound probe via the securement mechanism.

3. The assembly of claim 1, wherein:
    the probe head is configured to be inserted through the top opening, and
    the bottom opening extends across the patient coupling surface.

4. The assembly of claim 1, wherein the accessory implement includes an ultrasound gel disposed within the bottom opening.

5. The assembly of claim 1, wherein the accessory attachment surface is configured for attachment of the probe accessory thereto, the accessory attachment surface disposed at a defined position and orientation with respect to the probe head.

6. The assembly of claim 1, wherein the protrusion is configured to be transitionable between an extended state and a collapsed state.

7. The assembly of claim 1, wherein the securement mechanism includes one or more deflectable clips configured to extend around at least partially around the ultrasound probe.

8. The assembly of claim 1, wherein the sheath is disposed between the ultrasound probe and the accessory implement.

9. The assembly of claim 1, wherein the sheath includes a stretchable portion defining a reduced circumferential perimeter of the sheath, the stretchable portion configured to secure the sheath to the ultrasound probe.

10. The assembly of claim 1, wherein the sheath includes an ultrasound coupling area extending across the patient coupling surface of the ultrasound probe, the ultrasound coupling area including an ultrasound coupling capability that exceeds other portions of the sheath extending away from the ultrasound coupling area.

11. The assembly of claim 10, wherein the ultrasound coupling area includes an ultrasound gel.

12. The assembly of claim 1, wherein the sheath and the accessory implement are inseparably attached to each other.

13. An accessory attachment implement for an ultrasound probe, comprising:
- a circumferential wall extending contiguously around a cavity having a top opening and a bottom opening, the cavity configured to receive a head of the ultrasound probe therein via the top opening, the circumferential wall defining:
  - a front wall disposed along a front side of the cavity, wherein:
    - the front wall includes an accessory attachment surface disposed at a defined angle with respect to a patient coupling surface of the ultrasound probe, and
    - the accessory attachment surface includes an accessory connector; and
  - a back wall disposed along a back side of the cavity opposite the front side, wherein:
    - the back wall extends contiguously upward to define an upper portion of the back wall,
    - the upper portion is configured to extend along and adjacent to a back side of the ultrasound probe from a bottom end of the upper portion to a top end of the upper portion, and
    - the upper portion adjacent the top end includes a securement mechanism configured to rigidly secure the accessory attachment implement to the ultrasound probe;
- a protrusion extending away from the back wall, the protrusion configured to enable a clinician to handle the ultrasound probe using only two fingers; and
- a sheath coupled with the circumferential wall along an inside surface of the circumferential wall, the sheath configured to cover the ultrasound probe, wherein the bottom opening is sized and shaped to correspond to the patient coupling surface of the ultrasound probe.

14. The implement of claim 13, further comprising an ultrasound gel disposed within the bottom opening.

15. The implement of claim 14, wherein the ultrasound gel is coupled with the sheath.

16. The implement of claim 15, wherein at least a portion of the ultrasound gel is coupled with an inside surface of the sheath.

17. The implement of claim 16, wherein at least the portion of the ultrasound gel is a contained portion within a frangible pouch of a patient coupling area of the sheath.

18. The implement of claim 17, wherein the frangible pouch is configured to release the contained portion of the ultrasound gel from the frangible pouch when the patient coupling surface is pressed against a skin surface of a patient.

19. The implement of claim 13, wherein the sheath includes a stretchable band configured to cinch the sheath around the ultrasound probe.

20. The implement of claim 13, wherein the securement mechanism includes one or more deflectable clip members extending away from the upper portion toward the front side.

* * * * *